Patented Jan. 26, 1932

1,842,934

UNITED STATES PATENT OFFICE

MELVIN DE GROOTE, OF ST. LOUIS, AND BERNHARD KEISER, OF WEBSTER GROVES, MISSOURI, ASSIGNORS, BY MESNE ASSIGNMENTS, TO TRETOLITE COMPANY, OF WEBSTER GROVES, MISSOURI, A CORPORATION OF MISSOURI

PROCESS FOR BREAKING PETROLEUM EMULSIONS

No Drawing. Application filed January 21, 1929. Serial No. 334,109.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil," "roily oil," "emulsified oil," and "bottom settlings."

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent used in our process consists of a substituted sulfonic polycyclic aromatic body of the type $X R SO_3 Z$, wherein X stands for a polycyclic aromatic nucleus and R stands for an alcohol residue derived from an alcohol containing fewer than three carbon atoms in the molecule, $SO_3$ is the sulfonic residue, and Z is an hydrogen ion equivalent of the kind subsequently defined. It is formed preferably from substances of the class that yield insoluble precipitates with either soluble calcium or soluble magnesium and can be produced or obtained by introducing ethyl or methyl alcohol residues into a polycyclic aromatic nucleus. The polycyclic aromatic body may consist of naphthalene, anthracene, naphthacene, or other substances having similar properties. Instead of using unaltered polycyclic aromatic bodies, derivatives may be employed, such as halogen derivatives, nitro derivatives, hydroxy derivatives, or hydrogenated derivatives. If desired, the sulfonic group may be introduced into the polycyclic aromatic body before the introduction of alcohol residues of the kind described. For instance, naphthalene sulfonic acid, or naphthalene disulfonic acid, or beta naphthol sulfonic acid may be employed.

In manufacturing or producing a treating agent or demulsifying agent of the kind above referred to, the alcohol can be introduced into the aromatic nucleus by three well known methods. One of said methods is characterized by the fact that the alcohols are condensed with polycyclic aromatic bodies by treating them with strong sulfonating agents, such as sulfuric acid, oleum, or chloro-sulfonic acid, preferably in excess, at elevated temperatures and especially in the presence of a small quantity of a phosphorus compound such as phosphoric acid, phosphorus pentachloride, or phosphorus oxychloride. During such condensing operation sulfonation of the aromatic body also takes place, thus producing a sulfonated substituted aromatic. Obviously, more than two alcohol residues can be introduced into the polycyclic body, and furthermore, more than one sulfonic group can be introduced. It is not necessary that a single alcohol be employed, but two or more different alcohols may be employed; for instance, methyl alcohol, ethyl alcohol, butyl alcohol, or amyl alcohol, provided that at least one of the alcohol residues is derived from an alcohol having fewer than three carbon atoms in the molecule; namely, either methyl or ethyl. Whatever type or kind of alcohols are used to produce the treating agent contemplated by our process, it is essential that the alcohol or alcohols which are employed have fewer than twelve carbon atoms each.

It is to be understood that this reaction is not limited to the introduction of aliphatic alcohols, but can also be applied to the introduction of a residue from an aromatic alcohol such as hexahydrophenol. Likewise, aralkyl alcohols may be employed, such as benzyl alcohol, or a cyclic alcohol may be employed, such as cyclobutanol. In the introduction of alcohols other than ethyl or methyl alcohol, it is possible even to introduce two or more alcohols, and they need not be of the same kind; for instance, after the introduction of the methyl or ethyl alcohol, it would be possible to introduce another aliphatic alcohol and another aromatic alcohol, or else introduce an aralkyl alcohol or a cyclic alcohol.

Another method that can be used to produce treating agents or demulsifying agents of the kind contemplated by our process, is to employ the well known Friedel and Craft reaction for introducing a substitution residue into an aromatic. Methyl alcohol may be converted by action of a suitable phosphorus halogen compound into a suitable methyl halide such as methyl chloride. This material can be treated with a polycyclic aromatic body of the kind above described in the presence of anhydrous aluminum chloride to give the substituted aromatic body. Said aromatic body can be subsequently sulfonated to give a substituted aromatic sulfonic body of the kind referred to in the method first described.

A third method is to dissolve a polycyclic aromatic body, such as naphthalene or tetralin, in an excess of sulfuric acid or other suitable sulfonating agent, and then introduce into the same ethylene, alone or in addition to a material, such as propylene, butylene, or amylene, in such molecular proportions as to produce a treating agent having the general characteristics above described.

While various procedures may be employed to produce a treating agent or demulsifying agent suitable for use in our process, we prefer to produce said agent by complete reaction of two moles of ethyl alcohol and one mole of amyl alcohol with one mole of naphthalene in the presence of a large excess of 66° sulfuric acid, preferably at a temperature above the melting point of naphthalene. Said reaction is continued until the amyl alcohol and at least one of the ethyl alcohol residues, and preferably both, are introduced into the polycyclic nucleus with a simultaneous introduction of one sulfonic group. The reaction involving the introduction of the sulfonic group is, of course, well understood. The introduction of the ethyl groups and amyl group depends on the formation of ethyl or amyl acid sulfate with the splitting of water. Said ethyl or amyl acid sulfate under the conditions described, reacts with the polycyclic body to yield the desired material. When sulfonation is complete, the mass is diluted with water until an upper layer separates. The upper layer is drawn off and neutralized with any suitable base, such as caustic soda, caustic potash, or ammonia. We prefer to use ammonia. Part of the reagents prepared according to the above procedure give precipitates with alkaline earth salts, and we prefer to use one of the kind just described which will give such a precipitate. The reagent thus prepared is tested for the production of insoluble alkaline earth salts. For example, a 1% solution of the reagent may be mixed with a 1% solution of magnesium sulfate and heated for 10 to 30 minutes in a water bath just below the boiling point of water, if required. In the test with either the calcium salt or the magnesium salt, a precipitate should be obtained which remains after the mixture is diluted with two times the volume of distilled water.

The material or substance above described can be employed as an acid mass to treat a petroleum emulsion, but this is not desirable, due to its corrosive effect. There is no objection to an excess of alkali, if desired. Such material can also be converted into an ester by esterification in the usual manner to produce an aromatic or aliphatic ester such as the ethyl ester. Some of the esters so produced may be oil-soluble such as the hexyl ester. The treating agent, when it is ready for use, may be acidic in nature, and the complex substituted aromatic sulfonic group may be in such a form that it is united with an acid hydrogen ion, as is the case when the acid body itself is employed. When said acidic material is neutralized, the hydrogen ion is replaced by a suitable metallic ion equivalent, such as a true metallic ion or an ammonium radical. We will refer to the hydrogen ion or its metallic substitute or its organic substitute as the hydrogen ion equivalent.

The form, state or condition of the treating agent at the time it is mixed with or applied to the petroleum emulsion to be treated may be varied to suit existing conditions. It can be used in substantially anhydrous state, or in solutions of any convenient strength. A concentrated solution can be emulsified into oil by agency of any suitable oil-soluble emulsifiers, such as calcium oleate. The treating agent can be formed entirely from a material of the kind previously described, or it can be formed from such a material in combination with other well known treating agents for petroleum emulsions of the water-in-oil type, such as water softeners, modified fatty bodies, or their soaps, petroleum sulfonic acids or their soaps, or other substance having similar properties.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

What we claim as new and desire to secure by Letters Patent of the United States is:

1. A process for breaking a petroleum emulsion of the water-in-oil type, which consists in subjecting the emulsion to the action of a demulsifying agent comprising a substituted polycyclic aromatic sulfonic body containing at least one alcohol residue derived from an aliphatic alcohol having fewer than three carbon atoms.

2. A process for breaking a petroleum emulsion of the water-in-oil type, which consists in subjecting the emulsion to the action of a water-soluble demulsifying agent comprising a substituted polycyclic aromatic sulfonic body containing at least one alcohol residue derived from an aliphatic alcohol having fewer than three carbon atoms.

3. A process for breaking a petroleum emulsion of the water-in-oil type, which consists in subjecting the emulsion to the action of a water-soluble demulsifying agent comprising a water-soluble salt of a substituted polycyclic aromatic sulfonic body containing at least one alcohol residue derived from an aliphatic alcohol having fewer than three carbon atoms.

4. A process for breaking a petroleum emulsion of the water-in-oil type, which consists in subjecting the emulsion to the action of a water-soluble demulsifying agent comprising an ammonium salt of a substituted polycyclic aromatic sulfonic body containing at least one alcohol residue derived from an aliphatic alcohol having fewer than three carbon atoms.

5. A process for breaking a petroleum emulsion of the water-in-oil type, which consists in subjecting the emulsion to the action of a demulsifying agent comprising a substituted bicyclic aromatic sulfonic body containing at least one alcohol residue derived from an aliphatic alcohol having fewer than three carbon atoms.

6. A process for breaking a petroleum emulsion of the water-in-oil type, which consists in subjecting the emulsion to the action of a water-soluble demulsifying agent comprising a substituted bicyclic aromatic sulfonic body containing at least one alcohol residue derived from an aliphatic alcohol having fewer than three carbon atoms.

7. A process for breaking a petroleum emulsion of the water-in-oil type, which consists in subjecting the emulsion to the action of a water-soluble demulsifying agent comprising a water-soluble salt of a substituted bicyclic aromatic sulfonic body containing at least one alcohol residue derived from an aliphatic alcohol having fewer than three carbon atoms.

8. A process for breaking a petroleum emulsion of the water-in-oil type, which consists in subjecting the emulsion to the action of a water-soluble demulsifying agent comprising an ammonium salt of a substituted bicyclic aromatic sulfonic body containing at least one alcohol residue derived from an aliphatic alcohol having fewer than three carbon atoms.

9. A process for breaking a petroleum emulsion of the water-in-oil type, which consists in subjecting the emulsion to the action of a demulsifying agent comprising a substituted bicyclic aromatic sulfonic body containing an ethyl alcohol residue.

10. A process for breaking a petroleum emulsion of the water-in-oil type, which consists in subjecting the emulsion to the action of a water-soluble demulsifying agent comprising a substituted bicyclic aromatic sulfonic body containing an ethyl alcohol residue.

11. A process for breaking a petroleum emulsion of the water-in-oil type, which consists in subjecting the emulsion to the action of a water-soluble demulsifying agent comprising a water-soluble salt of a substituted bicyclic aromatic sulfonic body containing an ethyl alcohol residue.

12. A process for breaking a petroleum emulsion of the water-in-oil type, which consists in subjecting the emulsion to the action of a water-soluble demulsifying agent comprising an ammonium salt of a substituted bicyclic aromatic sulfonic body containing an ethyl alcohol residue.

13. A process for breaking a petroleum emulsion of the water-in-oil type, which consists in subjecting the emulsion to the action of a demulsifying agent comprising a substituted bicyclic aromatic sulfonic body containing an ethyl alcohol residue, and capable of producing a precipitate with an alkaline earth salt.

14. A process for breaking a petroleum emulsion of the water-in-oil type, which consists in subjecting the emulsion to the action of a water-soluble demulsifying agent comprising a substituted bicyclic aromatic sulfonic body containing an ethyl alcohol residue, and capable of producing a precipitate with an alkaline earth salt.

15. A process for breaking a petroleum emulsion of the water-in-oil type, which consists in subjecting the emulsion to the action of a water-soluble demulsifying agent comprising a water-soluble salt of a substituted bicyclic aromatic sulfonic body containing an ethyl alcohol residue, and capable of producing a precipitate with an alkaline earth salt.

16. A process for breaking a petroleum emulsion of the water-in-oil type, which consists in subjecting the emulsion to the action of a water-soluble demulsifying agent comprising an ammonium salt of a substituted bicyclic aromatic sulfonic body containing an ethyl alcohol residue, and capable of producing a precipitate with an alkaline earth salt.

MELVIN DE GROOTE.
BERNHARD KEISER.